(12) United States Patent
Purdy et al.

(10) Patent No.: US 7,473,566 B1
(45) Date of Patent: Jan. 6, 2009

(54) METHOD AND APPARATUS FOR CONTROLLING A FILM FORMATION PROCESS WITH MULTIPLE OBJECTIVES

(75) Inventors: Matthew A. Purdy, Austin, TX (US); Robert J. Chong, Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 170 days.

(21) Appl. No.: 10/770,682

(22) Filed: Feb. 3, 2004

(51) Int. Cl.
 $H01L\ 21/66$ (2006.01)
(52) U.S. Cl. ........................................................ 438/14
(58) Field of Classification Search ................... 438/5, 438/7, 10–11, 14, 16–18, 22–24, 29, 31, 438/34–36, 128–130, 149, 484, 538
See application file for complete search history.

(56) References Cited

U.S. PATENT DOCUMENTS

| | | | | | |
|---|---|---|---|---|---|
| 5,994,217 | A | * | 11/1999 | Ng | 438/636 |
| 6,083,852 | A | * | 7/2000 | Cheung et al. | 438/791 |
| 6,162,709 | A | * | 12/2000 | Raoux et al. | 438/513 |
| 6,458,605 | B1 | * | 10/2002 | Stirton | 438/7 |
| 6,495,391 | B1 | * | 12/2002 | Chan | 438/59 |
| 6,505,090 | B1 | * | 1/2003 | Harakawa | 700/121 |
| 6,514,667 | B2 | * | 2/2003 | Angelopoulos et al. | 430/271.1 |
| 6,544,871 | B1 | * | 4/2003 | Honeycutt | 438/586 |
| 6,673,635 | B1 | * | 1/2004 | Hellig et al. | 438/7 |
| 6,721,616 | B1 | * | 4/2004 | Ryskoski | 700/108 |
| 6,745,086 | B1 | * | 6/2004 | Pasadyn et al. | 700/28 |
| 6,790,686 | B1 | * | 9/2004 | Purdy et al. | 438/14 |
| 2003/0203577 | A1 | * | 10/2003 | Lowe et al. | 438/275 |
| 2004/0101983 | A1 | * | 5/2004 | Jones et al. | 438/14 |
| 2004/0115841 | A1 | * | 6/2004 | Molnar | 438/5 |
| 2005/0221514 | A1 | * | 10/2005 | Pasadyn et al. | 438/14 |

* cited by examiner

Primary Examiner—Walter L Lindsay, Jr.
Assistant Examiner—Andre' C Stevenson
(74) Attorney, Agent, or Firm—Williams, Morgan & Amerson, P.C.

(57) ABSTRACT

A method includes defining a plurality of objectives for a film formation process and employing a control equation incorporating the plurality of objectives to generate at least one operating recipe parameter for the film formation process. A system includes a film formation unit and a process control unit. The film formation unit is adapted to perform a film formation process in accordance with an operating recipe. The process control unit is adapted to define a plurality of objectives for the film formation process and employ a control equation incorporating the plurality of objectives to generate at least one operating recipe parameter for the film formation process.

17 Claims, 2 Drawing Sheets

METHOD AND APPARATUS FOR CONTROLLING A FILM FORMATION PROCESS WITH MULTIPLE OBJECTIVES

BACKGROUND OF THE INVENTION

1. Field of the Invention

This invention relates generally to the field of semiconductor device manufacturing and, more particularly, to a method and apparatus for controlling a film formation process with multiple objectives.

2. Description of the Related Art

There is a constant drive within the semiconductor industry to increase the quality, reliability and throughput of integrated circuit devices, e.g., microprocessors, memory devices, and the like. This drive is fueled by consumer demands for higher quality computers and electronic devices that operate more reliably. These demands have resulted in a continual improvement in the manufacture of semiconductor devices, e.g., transistors, as well as in the manufacture of integrated circuit devices incorporating such transistors. Additionally, reducing the defects in the manufacture of the components of a typical transistor also lowers the overall cost per transistor as well as the cost of integrated circuit devices incorporating such transistors.

Generally, a set of processing steps is performed on a lot of wafers using a variety of processing tools, including photolithography steppers, etch tools, deposition tools, polishing tools, thermal processing tools, implantation tools, etc. The technologies underlying semiconductor processing tools have attracted increased attention over the last several years, resulting in substantial refinements. However, despite the advances made in this area, many of the processing tools that are currently commercially available suffer certain deficiencies. In particular, such tools often lack advanced process data monitoring capabilities, such as the ability to provide historical parametric data in a user-friendly format, as well as event logging, real-time graphical display of both current processing parameters and the processing parameters of the entire run, and remote, i.e., local site and worldwide, monitoring. These deficiencies can engender nonoptimal control of critical processing parameters, such as throughput, accuracy, stability and repeatability, processing temperatures, mechanical tool parameters, and the like. This variability manifests itself as within-run disparities, run-to-run disparities and tool-to-tool disparities that can propagate into deviations in product quality and performance, whereas an ideal monitoring and diagnostics system for such tools would provide a means of monitoring this variability, as well as providing means for optimizing control of critical parameters.

One technique for improving the operation of a semiconductor processing line includes using a factory wide control system to automatically control the operation of the various processing tools. The manufacturing tools communicate with a manufacturing framework or a network of processing modules. Each manufacturing tool is generally connected to an equipment interface. The equipment interface is connected to a machine interface which facilitates communications between the manufacturing tool and the manufacturing framework. The machine interface can generally be part of an advanced process control (APC) system. The APC system initiates a control script based upon a manufacturing model, which can be a software program that automatically retrieves the data needed to execute a manufacturing process. Often, semiconductor devices are staged through multiple manufacturing tools for multiple processes, generating data relating to the quality of the processed semiconductor devices.

During the fabrication process, various events may take place that affect the performance of the devices being fabricated. That is, variations in the fabrication process steps result in device performance variations. Factors, such as feature critical dimensions, doping levels, contact resistance, particle contamination, etc., all may potentially affect the end performance of the device. Various tools in the processing line are controlled in accordance with performance models to reduce processing variations. Commonly controlled tools include photolithography steppers, polishing tools, etching tools, and deposition tools. Pre-processing and/or post-processing metrology data is supplied to process controllers for the tools. Operating recipe parameters, such as processing time, are calculated by the process controllers based on the performance model and the metrology information to attempt to achieve post-processing results as close to a target value as possible. Reducing variation in this manner leads to increased throughput, reduced cost, higher device performance, etc., all of which equate to increased profitability.

Among the important aspects in semiconductor manufacturing are film formation processes. With individual semiconductor devices becoming smaller and circuits within the devices operating faster, electrical signals must move fast enough through the circuits to prevent processing delays. In this environment, film thicknesses are being pushed ever thinner while maintaining or improving electrical characteristics. Typically, run-to-run control of film formation processes involves maintaining a desired thickness for the formed process layer. While thickness is an important objective, there are other film properties that could be equally as important, depending on the particular application. Examples of such properties include optical properties (index of refraction, extinction coefficient), across-wafer uniformity, gap-fill characteristics, resistivity, dielectric coefficient (i.e., for low k dielectric films), reflectivity, film stress, etc. A control scenario that uses thickness as the controlled variable fails to address these other concerns.

The present invention is directed to overcoming, or at least reducing the effects of, one or more of the problems set forth above.

SUMMARY OF THE INVENTION

One aspect of the present invention is seen in a method for controlling a film formation process. The method includes defining a plurality of objectives for the film formation process and employing a control equation incorporating the plurality of objectives to generate at least one operating recipe parameter for the film formation process.

Another aspect of the present invention is seen in a system that includes a film formation unit and a process control unit. The film formation unit is adapted to perform a film formation process in accordance with an operating recipe. The process control unit is adapted to define a plurality of objectives for the film formation process and employ a control equation incorporating the plurality of objectives to generate at least one operating recipe parameter for the film formation process.

BRIEF DESCRIPTION OF THE DRAWINGS

The invention may be understood by reference to the following description taken in conjunction with the accompanying drawings, in which like reference numerals identify like elements, and in which.

Figure 1:
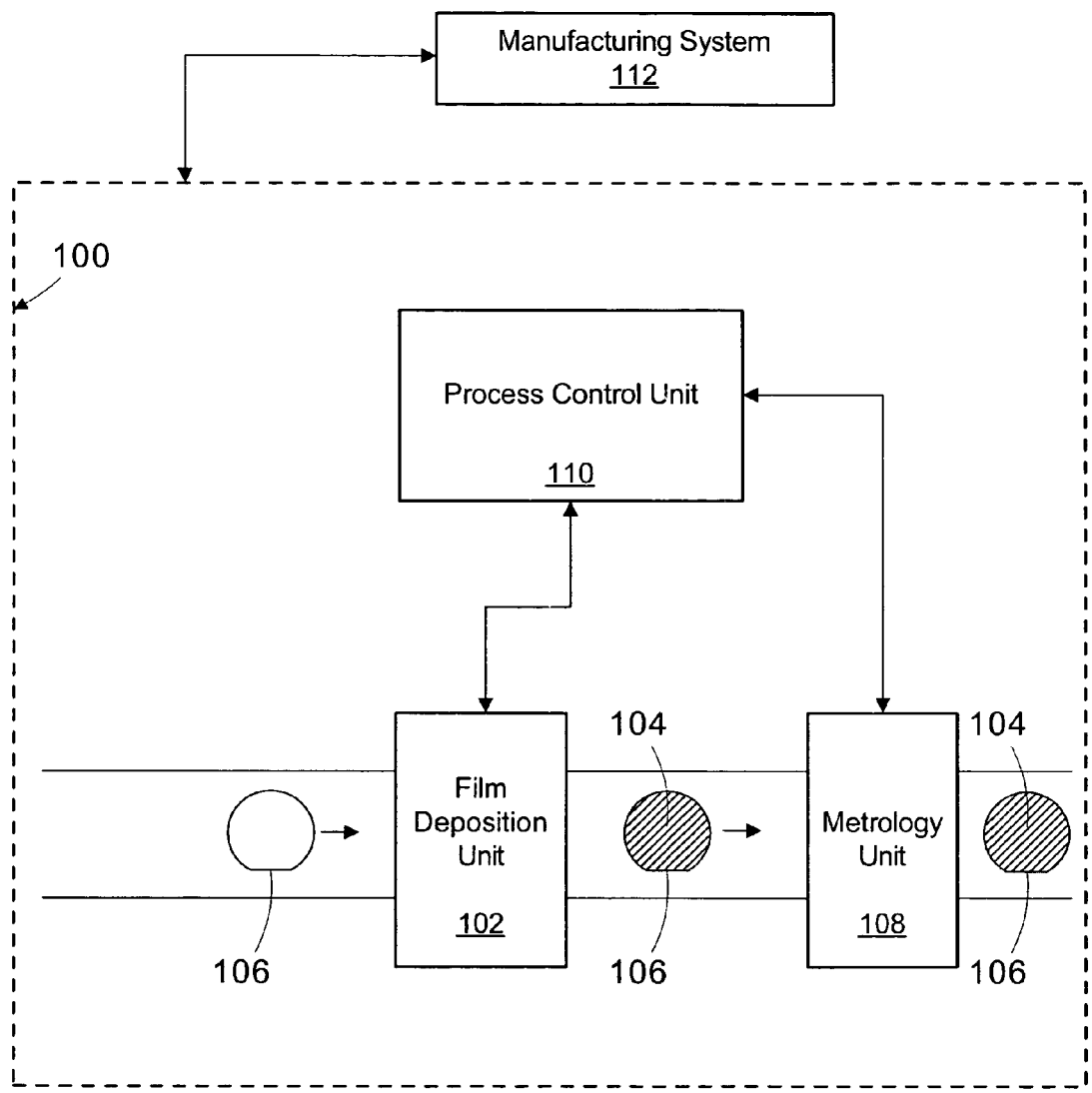
FIG. 1 is a simplified diagram of an apparatus for run-to-run control of a film application process in accordance with one illustrative embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring now to FIG. 1, a simplified diagram of an apparatus 100 for run-to-run control of a film application process in accordance with one illustrative embodiment of the present invention is provided. A film formation unit 102 is provided that is capable of applying a film 104, or process layer (only a portion of which is shown) to a semiconductor wafer 106. At least one metrology unit 108 is provided that is capable of measuring a characteristic of the film 104 after application of the film 104. In some embodiments, another metrology unit (not shown) may also be provided to measure a characteristic of the wafer 106 prior to formation of the film 104. A process control unit 110 is interfaced with the film formation unit 102 and the at least one metrology unit 110. The process control unit 110 is capable of controlling the film formation unit 102 according to an operating recipe and according to metrology data collected by the metrology unit 110.

Portions of the invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

The apparatus 100 may be part of a larger manufacturing system 112 (e.g., a semiconductor fabrication facility) that includes multiple processing units of various types. An exemplary information exchange and process control framework suitable for use in the manufacturing system 112 is an Advanced Process Control (APC) framework, such as may be implemented using the Catalyst system previously offered commercially by KLA-Tencor, Inc. The Catalyst system uses Semiconductor Equipment and Materials International (SEMI) Computer Integrated Manufacturing (CIM) Framework compliant system technologies and is based the Advanced Process Control (APC) Framework. CIM (SEMI E81-0699-Provisional Specification for CIM Framework Domain Architecture) and APC (SEMI E93-0999-Provisional Specification for CIM Framework Advanced Process Control Component) specifications are publicly available from SEMI, which is headquartered in Mountain View, Calif.

The film formation unit 102 may be a of variety of tool types, such as, but not limited to, a chemical vapor deposition unit, a furnace deposition unit, a furnace oxidation unit, a thermal growth unit, a physical vapor deposition unit, an electroless plating unit, and an electrolytic plating unit. In some instances, the film 104 may be integral with one or more secondary structures, for example, but not limited to, vias, contacts, pads, plugs, or trenches. That is, the film 104 may be formed above a layer having a plurality of openings formed therein, for example, a layer of silicon dioxide having openings for conductive vias to be formed therein. In this situation, the film 104 is formed in the openings in an underlying layer and above the surface of the layer.

As described in greater detail below, the metrology unit 108 may also be of a variety of types, depending on the type of feedback data required by the process control unit 110 to control the application of the film 104.

In the illustrated embodiment, the process control unit 110 implements a control model including one or more control equations for determining the parameters of the operating recipes. In general, the process control unit 110 implements a model predictive control (MPC) technique. The process control unit 110 considers at least two control objectives for the film formation process to determine the operating recipe parameters. The following examples illustrate exemplary applications where two or more control objective may exist for the film formation process. For the following control equations, A & B are predetermined correlation coefficients describing the dynamics of the system. The derivation of such coefficients is within the capabilities of one of ordinary skill in the art, and is therefore not described in greater detail herein. Also, the recipe parameters controlled in accordance with the control equations are typically subject to upper and/or lower limits, the values of which depend on the specific implementation of the film formation process and the tool used. The application of the present invention is not limited to any particular type of control technique. For example, the control equations may be simple, linear equations, or more complicated, non-linear equations involving several interaction terms. Response surface model techniques may be used to develop these equations.

Example processes:

A. High Density Plasma (HPP) tetra-ethyl-ortho-silicate (TEOS) Deposition.
Objectives: 1. Across wafer uniformity
2. Gap-fill
Control Equation:

$$\begin{bmatrix} GapFill \\ WfrUnif \end{bmatrix} = \begin{bmatrix} A_{1,1} & A_{1,2} \\ A_{2,1} & A_{2,2} \end{bmatrix} [Power\ Temperature] + \begin{bmatrix} B_{1,1} & B_{1,2} \\ B_{1,2} & B_{2,2} \end{bmatrix} [GasFlow\_AGasFlow\_B]$$

B. Silicon Oxinitride (SiON) Anti-Reflective Coating (ARC) Deposition
Objectives: 1. Reflectivity
2. Index of Refraction
Control Equation:

$$\begin{bmatrix} Reflectivity \\ Index\_of\_Refraction \end{bmatrix} = \begin{bmatrix} A_{1,1} & A_{1,2} \\ A_{2,1} & A_{2,2} \end{bmatrix} [GasFlow\ Temperature]$$

C. Metal ARCs (e.g. TiN on Top of Aluminum)
Objectives: 1. Reflectivity
2. Defect Density
3. Uniformity
Control Equation:

$$\begin{bmatrix} Reflectivity \\ DefectDensity \\ Uniformity \end{bmatrix} = \begin{bmatrix} A_{1,1} & A_{1,2} & A_{1,3} \\ A_{2,1} & A_{2,2} & A_{2,3} \\ A_{3,1} & A_{3,2} & A_{3,3} \end{bmatrix} [Power\ Temperature\ GasFlow]$$

D. Doped Amorphous Silicon (DASi) Deposition
Objectives: 1. Sheet Resistance
2. Index of Refraction
Control Equation:

$$\begin{bmatrix} SheetRes \\ Index\_of\_Refraction \end{bmatrix} = \begin{bmatrix} A_{1,1} & A_{1,2} \\ A_{2,1} & A_{2,2} \end{bmatrix} [DopantConcentration\ Temperature]$$

E. Borophosphosilicate TEOS (BPTEOS)
Objectives: 1. Glass Transition Temperature Depression
2. Dopant Gettering Capability
Control Equation:

$$\begin{bmatrix} GlassTransitionTemperatureDepression \\ DopantGetteringCapability \end{bmatrix} = \begin{bmatrix} A_{1,1} & A_{1,2} \\ A_{2,1} & A_{2,2} \end{bmatrix} [DopantConcentration\ Temperature]$$

F. Aluminum Physical Vapor Deposition
Objectives: 1. Reflectivity
2. Wafer Uniformity
Control Equation:

$$\begin{bmatrix} Reflectivity \\ WfrUnif \end{bmatrix} = \begin{bmatrix} A_{1,1} & A_{1,2} & A_{1,3} \\ A_{2,1} & A_{2,2} & A_{2,3} \end{bmatrix} \begin{bmatrix} ArgonGasFlow \\ RFPower \\ (ArgonGasFlow)(RFPower) \end{bmatrix}$$

Constraints:

$$Cx+B<=RFPower<=Cx^2+Dx,$$

where x is the independent variable and C, B, and D are constants determined based on the specific implementation.

In general, the process control unit 110 solves the control equations to determine operating recipe parameters that meet the objectives, yet are within the constraints. In addition, the process control unit 110 may preferentially weight one of the objectives with respect to the others. For example, the process control unit 110 may place a higher value on achieving the gap fill objective that the uniformity objective. A more detailed example of how such parameters are determined is provided below with respect to a simplified version of the HDP TEOS deposition process provided in example A. Similar approaches may be used for the other examples.

An objective function may be defined in general form by:

$$\min \Sigma (y^T Qy + u^T Ru + \Delta u^T S \Delta u),$$

where y=measured output u=input $\Delta u$=change in the input from one run to the next Q=Relative Penalty for missing target R=Relative Penalty on changing the input from a desired setpoint S=Relative Penalty on changing the input from one run to the next A higher weight penalty for Q, R or S represents a higher emphasis being placed on the corresponding objective.

The HDP TEOS process equation, modified for ease of illustration is:

$$\begin{bmatrix} GapFill \\ WfrUnif \end{bmatrix} = \begin{bmatrix} A_{1,1} & A_{1,2} \\ A_{2,1} & A_{2,2} \end{bmatrix} [Power\ Temperature] + \begin{bmatrix} B_{1,1} \\ B_{2,1} \end{bmatrix}$$

In accordance with the objective function, the measured outputs, y, represent the gap fill and wafer uniformity parameters. The inputs, u, are power and temperature. $A_{ij}$ represents the known model coefficients, and $B_{ij}$ represent the known prior settings. The power and temperature values are also known. Exemplary targets for the objectives are:

GapFill=0.5; and

WfrUnif=2%.

The particular values for the objectives may vary depending on the particular implementation, and the application of the present invention is not limited to any particular values. Constraints for the power and temperature may be defined as:

dd<=Power<C=cc; and ff<=Temperature <=ee.

Minimizing the objective function and solving for the inputs yields the following State Space equation:

$$\begin{bmatrix} x_{k1+1} \\ x_{k2+1} \end{bmatrix} = \begin{bmatrix} AA_{1,1} & AA_{1,2} \\ AA_{2,1} & AA_{2,2} \end{bmatrix} \begin{bmatrix} x_{k1} \\ x_{k2} \end{bmatrix} +$$

$$\begin{bmatrix} A_{1,1} & A_{1,2} \\ A_{2,1} & A_{2,2} \end{bmatrix} \begin{bmatrix} \text{Power} \\ \text{Temperature} \end{bmatrix}, \begin{bmatrix} \text{GapFill} \\ \text{Temperature} \end{bmatrix} =$$

$$\begin{bmatrix} C_{1,1} & C_{1,2} \\ C_{2,1} & C_{2,2} \end{bmatrix} \begin{bmatrix} x_{k1+1} \\ x_{k2+1} \end{bmatrix}$$

with the following constraints:

$$\begin{bmatrix} +1 & +0 \\ -1 & +0 \\ +0 & +1 \\ +0 & -1 \end{bmatrix} \begin{bmatrix} \text{Power} \\ \text{Temperature} \end{bmatrix} \leq \begin{bmatrix} cc \\ -dd \\ ee \\ -ff \end{bmatrix},$$

where the C matrix represents the output matrix.

Various techniques for solving the control equations in view of the objective function and constraints may be used. In one embodiment, a serial linear solution (e.g., linear programming) may be employed where the desired settings for the primary parameter are determined first using its model equation. Given these settings as an additional constraint, the values for the next parameter are then determined using its model equation. This technique is computationally simple, but may not yield an optimal result. A non-linear solution may be used to determine the process settings for all objectives relative to their objective weightings (i.e., the solution provided would be closest to the target for the objective with the largest weighting). Quadratic programming is one example of such a non-linear programming technique. A non-linear solution technique is computationally more intensive, but may provide a more optimal result. Commercially available software tools for solving the state space equation include MATLAB® offered by The MathWorks, Inc. of Natick, Mass.

Figure 2:
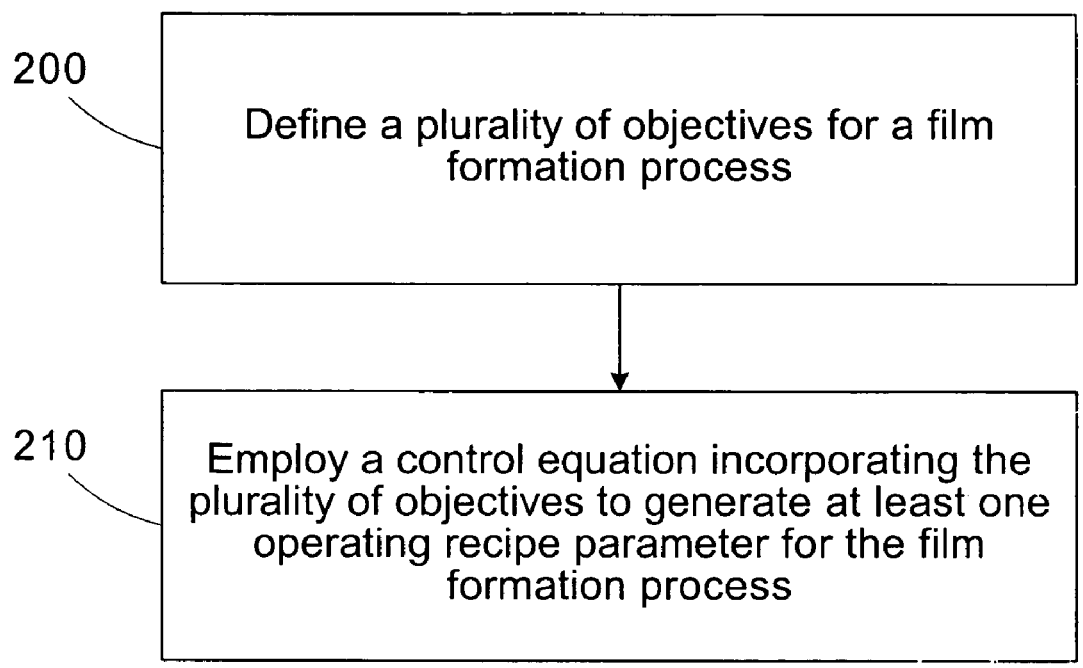
FIG. 2 is a simplified flow diagram of a method for controlling a film formation process with multiple objectives in accordance with another illustrative embodiment of the present invention.

Turning now to FIG. 2, a simplified flow diagram of a method for controlling a film formation process with multiple objectives in accordance with another illustrative embodiment of the present invention is provided. In block 200, a plurality of objectives is defined for a film formation process. In block 210, a control equation incorporating the plurality of objectives is employed to generate at least one operating recipe parameter for the film formation process.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:
    defining a plurality of objectives for a process for forming a film, each objective being associated with a characteristic of the film; and
    employing a control equation incorporating the plurality of objectives to generate at least one operating recipe parameter for the film formation process.

2. The method of claim 1, further comprising determining a constraint on the operating recipe parameter and wherein employing the control equation further comprises employing the control equation incorporating the plurality of objectives subject to the constraint on the operating recipe parameter.

3. The method of claim 1, further comprising:
    defining an objective function including the plurality of objectives; and
    solving the control equation in view of the objective function to determine the at least one operating recipe parameter.

4. The method of claim 3, further comprising determining a constraint on the operating recipe parameter and wherein solving the control equation further comprises solving the control equation to minimize the objective function subject to the constraint on the operating recipe parameter.

5. The method of claim 3, further comprising assigning a relative weight to each of the plurality of objectives in the objective function.

6. The method of claim 1, further comprising:
    assigning a relative weight to each of the plurality of objectives; and
    wherein employing the control equation further comprises employing the control equation incorporating the relative weights of the objectives.

7. The method of claim 1, wherein the film formation process further comprises at least one of a chemical vapor deposition process, a furnace deposition process, a furnace oxidation process, a physical vapor deposition process, a thermal growth process, an electroless plating process, and an electrolytic plating process.

8. The method of claim 1, wherein the film formation process comprises a tetra-ethyl-ortho-silicate deposition process, the plurality of objectives include a uniformity objective and a gap-fill objective, and wherein employing the control equation further comprises employing the control equation to generate at least one of a power, a temperature, and a gas flow operating recipe parameter for the film formation process.

9. The method of claim 1, wherein the film formation process comprises an anti-reflective coating deposition process, the plurality of objectives include a reflectivity objective and an index of refraction objective, and wherein employing the control equation further comprises employing the control equation to generate at least one of a gas flow and a temperature operating recipe parameter for the film formation process.

10. The method of claim 1, wherein the film formation process comprises a metal anti-reflective coating deposition process, the plurality of objectives include at least two of a reflectivity objective, a defectivity density objective, and a uniformity objective, and wherein employing the control equation further comprises employing the control equation to generate at least one of a power, a temperature, and a gas flow operating recipe parameter for the film formation process.

11. The method of claim 1, wherein the film formation process comprises a doped amorphous silicon deposition process, the plurality of objectives include a sheet resistance objective and an index of refraction objective, and wherein employing the control equation further comprises employing the control equation to generate at least one of a dopant concentration and a temperature operating recipe parameter for the film formation process.

12. The method of claim 1, wherein the film formation process comprises a borophosphosilicate tetra-ethyl-ortho-silicate deposition process, the plurality of objectives include a glass transition temperature depression objective and a dopant gettering capability objective, and wherein employing the control equation further comprises employing the control equation to generate at least one of a dopant concentration and a temperature operating recipe parameter for the film formation process.

13. The method of claim 1, wherein the film formation process comprises a metal deposition process, the plurality of objectives include a reflectivity objective and a wafer uniformity objective, and wherein employing the control equation further comprises employing the control equation to generate at least one of a gas flow rate and a power operating recipe parameter for the film formation process.

14. The method of claim 1, further comprising forming a film in accordance with the generated operating recipe parameter for the film formation process.

15. The method of claim 14, further comprising:

measuring at least one characteristic of the film corresponding to at least one of the objectives; and employing the control equation using the measured characteristic for a subsequent film formation process.

16. The method of claim 1, wherein employing the control equation further comprises employing a linear control equation.

17. The method of claim 1, wherein employing the control equation further comprises employing a non-linear control equation.

* * * * *